(12) United States Patent
Huang

(10) Patent No.: US 8,058,856 B2
(45) Date of Patent: Nov. 15, 2011

(54) MULTI-PHASE DC-DC CONVERTER AND METHOD FOR BALANCING CHANNEL CURRENTS

(75) Inventor: Hua-Chiang Huang, Hsinchu (TW)

(73) Assignee: UPI Semiconductor Corporation, Zhubei, Hsinchu County (TW)

( * ) Notice: Subject to any disclaimer, the term of this patent is extended or adjusted under 35 U.S.C. 154(b) by 854 days.

(21) Appl. No.: 12/153,126

(22) Filed: May 14, 2008

(65) Prior Publication Data

US 2009/0051335 A1    Feb. 26, 2009

Related U.S. Application Data

(60) Provisional application No. 60/957,952, filed on Aug. 24, 2007.

(51) Int. Cl.
*G05F 1/59* (2006.01)
(52) U.S. Cl. ........................................ 323/272
(58) Field of Classification Search .................. 323/272, 323/285; 363/65
See application file for complete search history.

(56) References Cited

U.S. PATENT DOCUMENTS

| | | | |
|---|---|---|---|
| 6,009,000 A * | 12/1999 | Siri | 363/21.09 |
| 6,160,725 A * | 12/2000 | Jansen | 363/65 |
| 6,278,263 B1 | 8/2001 | Walters et al. | |
| 6,414,470 B1 * | 7/2002 | Liu et al. | 323/272 |
| 6,670,794 B1 | 12/2003 | Wang et al. | |
| 6,839,252 B2 * | 1/2005 | Tai et al. | 363/65 |

* cited by examiner

*Primary Examiner* — Harry Behm
(74) *Attorney, Agent, or Firm* — Thomas|Kayden

(57) ABSTRACT

A multi-phase DC-DC converter is provided. A plurality of switching sets are coupled to an output, wherein each switching set includes a phase node. A plurality of inductors are separately coupled between the phase nodes and the output. A sense circuit has a plurality of sense units separately coupled to the phase nodes, each sensing a signal from the corresponding phase node and generating a sensing signal. A PWM generator includes a plurality of subtracting units, each subtracting a first signal from one of the sensing signals to generate a difference signal, wherein the first signal is generated by summing each of the sensing signals divided by a predetermined value except for the one of the sensing signals. The PWM generator generates a plurality of PWM signals to balance the currents of the inductors according to the difference signals.

6 Claims, 2 Drawing Sheets

MULTI-PHASE DC-DC CONVERTER AND METHOD FOR BALANCING CHANNEL CURRENTS

CROSS REFERENCE TO RELATED APPLICATIONS

This application claims the benefit of U.S. Provisional Application Ser. No. 60/957,952, filed Aug. 24, 2007, the entirety of which is incorporated by reference herein.

BACKGROUND OF THE INVENTION

1. Field of the Invention

The invention relates to a multi-phase DC-DC converter, and more particularly to a method for balancing a plurality of channel currents in a multi-phase DC-DC converter.

2. Description of the Related Art

Multi-phase DC-DC converters have been widely used for power supply circuits. However, conversion efficiency is easy to be degraded due to unbalanced currents caused by components or parameters mismatch between each of phases/channels in a multi-phase DC-DC converter.

In order to enhance the conversion efficiency, it is important to balance channel currents. A multi-phase DC-DC converter disclosed by U.S. Pat. No. 6,278,263 shares the load currents between each of the phases or channels in the converter, by which all of the channel currents are sensed and averaged with a summing circuit and a scaling circuit for balance control between each channels. Similarly, a multi-phase DC-DC converter disclosed by U.S. Pat. No. 6,670,794 averages entire sensed signals from each channel and compares the averaged signal with each sensed signals to balance each channel current.

BRIEF SUMMARY OF THE INVENTION

Multi-phase DC-DC converters and methods for balancing a plurality of channel currents in a multi-phase DC-DC converter are provided. An exemplary embodiment of such multi-phase DC-DC converter comprises a plurality of switching sets, a plurality of output inductors, a sense circuit and a PWM generator. The switching sets generate an output voltage at an output, wherein each switching set comprises a phase node. The output inductors are coupled between the phase nodes and the output, respectively. The sense circuit has a plurality of sense units respectively coupled to the phase nodes, wherein each sense unit senses a signal from the corresponding phase node and generates a sensing signal according to the signal. The PWM generator generates a plurality of PWM signals to balance a plurality of currents of the output inductors, and comprises an error amplifier for comparing a reference voltage with the output voltage to generate an error signal, and a plurality of calculating circuits and a plurality of comparators separately coupled to the calculating circuits. Each of the calculating circuits comprises a subtracting unit for subtracting a first signal from one of the sensing signals to generate a difference signal, wherein the first signal is generated by summing each of the sensing signals divided by a predetermined value except for the one of the sensing signals, and a summing unit for summing the difference signal and a ramp signal to generate a second signal. Each of the comparators compares the error signal with the corresponding second signal to generate the PWM signal. The switching sets generate the output voltage according to the PWM signals.

Moreover, an exemplary embodiment of a method for balancing a plurality of channel currents in a multi-phase DC-DC converter, wherein the multi-phase DC-DC converter has an output voltage and a plurality of phase nodes is provided. A plurality of signals are sensed from the corresponding phase nodes respectively, wherein each signal corresponds to the corresponding channel current. A plurality of sensing signals are generated according to the sensed signals, respectively. A reference voltage is compared with the output voltage to generate an error signal. A first signal is subtracted from one of the sensing signals to generate a difference signal, and the difference signal is summed with a ramp signal to generate a second signal for each of the corresponding phase nodes, wherein the first signal is generated by summing each of the sensing signals divided by a predetermined value except for the one of the sensing signals. The error signal is compared with the second signals to generate a plurality of PWM signals, respectively. The channel currents are adjusted according to the PWM signals, respectively.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
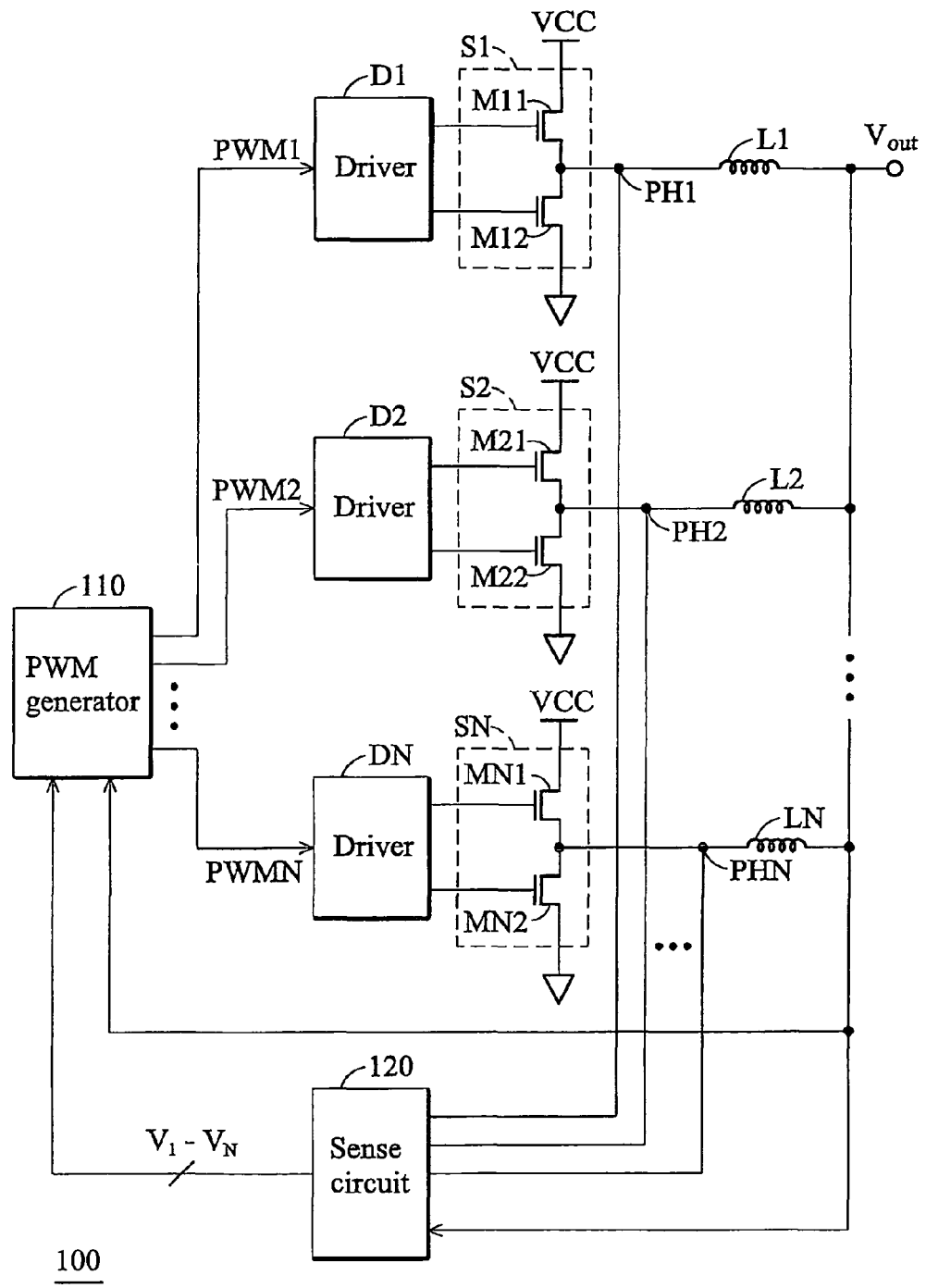
FIG. 1 shows a multi-phase DC-DC converter according to an embodiment of the invention.

FIG. 1 shows a multi-phase DC-DC converter 100 according to an embodiment of the invention. The multi-phase DC-DC converter 100 with N channels comprises a pulse width modulation (PWM) generator 110, N drivers D1-DN, N switching sets S1-SN, N output inductors L1-LN and a sense circuit 120. The PWM generator 110 provides N PWM signals PWM1-PWMN to the drivers D1-DN, respectively. The drivers D1-DN receive the PWM signals PWM1-PWMN to control the switching sets S1-SN, respectively. For example, the driver D1 receives the PWM signal PWM1 and generates a plurality of control signals to the switching set S1, which comprises two transistors M11 and M12, wherein the transistor M11 is coupled between a voltage VCC and a phase node PH1, and the transistor M12 is coupled between a ground GND and the phase node PH1. In addition, an output inductor L1 is coupled between the phase node PH1 and an output of the multi-phase DC-DC converter 100. In one embodiment, the switching set may include the driver. As shown in FIG. 1, the switching sets generate an output voltage $V_{out}$ at the output of the multi-phase DC-DC converter 100 through the output inductors. Furthermore, the output voltage $V_{out}$ is fed back to the PWM generator 110 and the sense circuit 120. The sense circuit 120 is composed of a plurality of sense units, wherein each sense unit is coupled to a phase node and senses a signal from the corresponding phase node to generate a sensing signal according to the signal, wherein the signal corresponds to the corresponding channel current. Consequently, the sense circuit 120 generates the sensing signals $V_1$-$V_N$ according to the output voltage $V_{out}$ and the signals (voltages/currents) from the phase nodes PH1-PHN. Then, the PWM generator 110 can generate the PWM signals PWM1-PWMN according to the sensing signals $V_1$-$V_N$ to balance each channel in the multi-phase DC-DC converter 100.

Figure 2:
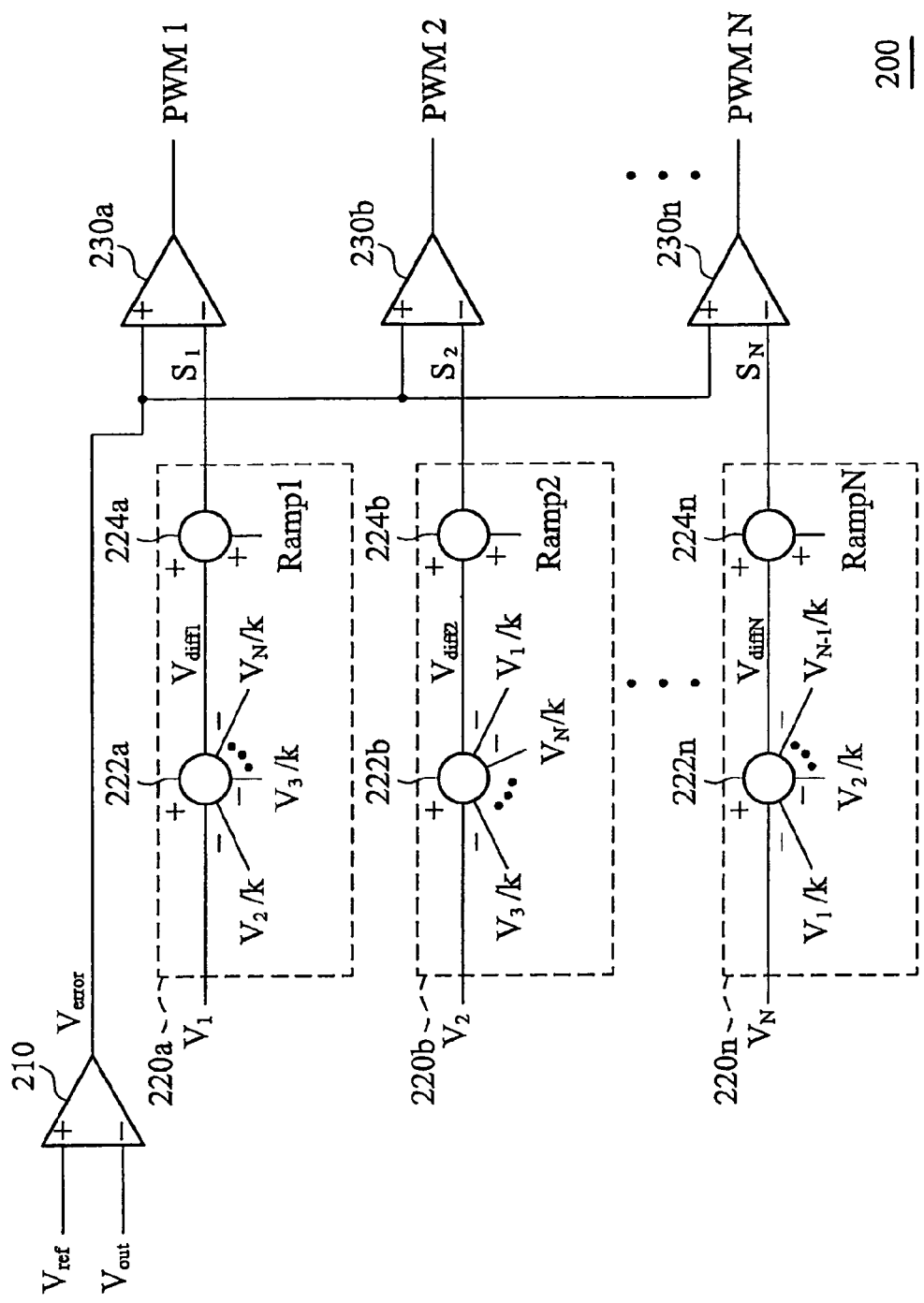
FIG. 2 shows a PWM generator of the multi-phase DC-DC converter according to an embodiment of the invention.

FIG. 2 shows a PWM generator 200 of the multi-phase DC-DC converter 100 according to an embodiment of the invention. The PWM generator 200 comprises an error amplifier 210, N calculating circuits 220a-220n and N comparators 230a-230n. The error amplifier 210 has an inverting input for receiving the output voltage $V_{out}$ and a non-inverting input for receiving a reference voltage $V_{ref}$, which is a predetermined voltage. Specifically, the error amplifier 210 compares the reference voltage $V_{ref}$ with the output voltage $V_{out}$ to generate an error signal $V_{error}$. Moreover, each of the comparators 230a-230n has a non-inverting input coupled to the error amplifier 210 for receiving the error signal $V_{error}$ and an inverting input coupled to the corresponding calculating circuit, wherein each of the calculating circuits 220a-220n comprises a subtracting unit 222 and a summing unit 224. For example, a comparator 230a is coupled to its corresponding calculating circuit 220a having a subtracting unit 222a and a summing unit 224a. The subtracting unit 222a subtracts a signal, which is generated by summing each of the sensing signals divided by k except for the sensing signal $V_1$, i.e. ($V_2$+ ... +$V_N$)/k, from the sensing signal $V_1$ to generate a difference signal $V_{diff1}$, wherein k is a predetermined value. Next, the summing unit 224a sums the difference signal $V_{diff1}$ and a ramp signal Ramp1 to generate a signal $S_1$. Then, the comparator 230a compares the error signal $V_{error}$ with the signal $S_1$ to generate the PWM signal PWM1. Finally, each PWM signal will be adjusted by the corresponding difference signal $V_{diff}$ to balance each channel in the multi-phase DC-DC converter.

In this embodiment, each of the difference signals $V_{diff1}$-$V_{diffN}$ is generated as shown in the following:

$$V_{diff1} = V_1 - \frac{V_2 + V_3 \wedge + V_N}{k} = V_1 - \frac{V_{sum1}}{k}$$

$$V_{diff2} = V_2 - \frac{V_1 + V_3 \wedge + V_N}{k} = V_2 - \frac{V_{sum2}}{k},$$

M $$V_{diffN} = V_N - \frac{V_1 + V_2 \wedge + V_{N-1}}{k} = V_N - \frac{V_{sumN}}{k}$$

where k is selected such that the difference signals $V_{diff1}$-$V_{diffN}$ are greater than 0, wherein the difference signals are analog signals. In one embodiment, k is equal to N-1. Specifically, each of the signals $V_{sum1}$-$V_{sumN}$ is a summation excluding the corresponding sensing signal from the entire sensing signals $V_1$-$V_N$. For example, the signal $V_{sum1}$ is a summation of the sensing signals except for the sensing signal $V_1$. Hence, in this embodiment, each of the difference signals $V_{diff1}$-$V_{diffN}$ is generated without using an averaged or summed signal of all of the sensing signals. In one embodiment, each of the calculating circuits 220a-220n further comprises two multiplying units (not shown) for adjusting the gain of the two signals received by the corresponding subtracting unit 222, respectively.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A multi-phase DC-DC converter, comprising:
    a plurality of switching sets for generating an output voltage at an output, wherein each switching set comprises a phase node;
    a plurality of output inductors separately coupled between the phase nodes and the output;
    a sense circuit having a plurality of sense units separately coupled to the phase nodes, each sense unit for sensing a signal from the corresponding phase node and generating a sensing signal according to the signal from the corresponding phase; and
    a PWM generator for generating a plurality of PWM signals to balance a plurality of currents of the output inductors, comprising:
        an error amplifier for comparing a reference voltage with the output voltage to generate an error signal;
        a plurality of calculating circuits, each comprising:
            a subtracting unit for subtracting a first signal from one of the sensing signals to generate a difference signal, wherein the first signal is generated by summing each of the sensing signals divided by a predetermined value except for the one of the sensing signals; and
            a summing unit for summing the difference signal and a ramp signal to generate a second signal; and
        a plurality of comparators separately coupled to the calculating circuits, each comparing the error signal with the corresponding second signal to generate the PWM signal,
    wherein the switching sets generate the output voltage according to the PWM signals, and each of the difference signals is greater than 0.

2. The multi-phase DC-DC converter as claimed in claim 1, wherein an amount of sensing signals is equal to N, and the predetermined value is equal to N-1.

3. The multi-phase DC-DC converter as claimed in claim 1, wherein the calculating circuit further comprises a first multiplying unit for adjusting a gain of the one of the sensing signals, and a second multiplying unit for adjusting a gain of the first signal.

4. A method for balancing a plurality of channel currents in a multi-phase DC-DC converter, wherein the multi-phase DC-DC converter has an output voltage and a plurality of phase nodes, comprising:
    sensing a plurality of signals from the corresponding phase nodes respectively, wherein each signal corresponds to the corresponding channel current;
    generating a plurality of sensing signals according to the sensed signals, respectively;
    comparing a reference voltage with the output voltage to generate an error signal;
    subtracting a first signal from one of the sensing signals to generate a difference signal and summing the difference signal and a ramp signal to generate a second signal for each of the corresponding phase nodes, wherein the first signal is generated by summing each of the sensing signals divided by a predetermined value except for the one of the sensing signals;
    comparing the error signal with the second signals to generate a plurality of PWM signals, respectively; and
    adjusting the channel currents according to the PWM signals, respectively, wherein each of the difference signals is greater than 0.

5. The method as claimed in claim 4, wherein an amount of sensing signals is equal to N, and the predetermined value is equal to N−1.

6. The method as claimed in claim 4, wherein subtracting the first signal from the one of the sensing signals further comprises: adjusting a gain of the one of the sensing signals; and adjusting a gain of the first signal.

* * * * *